(12) United States Patent
Su et al.

(10) Patent No.: US 8,317,139 B2
(45) Date of Patent: Nov. 27, 2012

(54) DISPLAY SUPPORT

(75) Inventors: Yung-Chun Su, Taipei County (TW); Chun-Jung Tsuo, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 0 days.

(21) Appl. No.: 13/211,259

(22) Filed: Aug. 16, 2011

(65) Prior Publication Data

US 2011/0297801 A1 Dec. 8, 2011

Related U.S. Application Data

(62) Division of application No. 12/197,927, filed on Aug. 25, 2008, now Pat. No. 8,016,252.

(30) Foreign Application Priority Data

Oct. 16, 2007 (TW) ................................ 96138644 A
Dec. 20, 2007 (TW) ................................ 96148895 A

(51) Int. Cl.
 *F16M 13/00* (2006.01)
 *G06F 1/16* (2006.01)

(52) U.S. Cl. ...................... 248/127; 248/157; 248/188.5; 248/917; 361/679.22

(58) Field of Classification Search ............... 248/188.5, 248/127, 157, 354.1, 917, 161, 149, 132, 248/919, 346.01, 346.03, 346.04, 125.8, 248/519, 523; 361/679.21, 679.22, 679.05
See application file for complete search history.

(56) References Cited

U.S. PATENT DOCUMENTS

| | | | | |
|---|---|---|---|---|
| 6,712,321 | B1 * | 3/2004 | Su et al. .................... | 248/123.11 |
| 6,905,099 | B2 * | 6/2005 | Sung ............................. | 248/146 |
| 7,374,139 | B2 * | 5/2008 | Tsai et al. ..................... | 248/161 |
| 7,460,363 | B2 * | 12/2008 | Teng ........................ | 361/679.27 |
| 7,515,402 | B2 * | 4/2009 | Tsuo .............................. | 349/60 |
| 7,764,491 | B2 * | 7/2010 | Zhao et al. .............. | 361/679.22 |
| 8,016,252 | B2 * | 9/2011 | Su et al. ......................... | 248/157 |
| 8,079,554 | B2 * | 12/2011 | Sui et al. ...................... | 248/157 |
| 2007/0034756 | A1 * | 2/2007 | Tsai et al. .................... | 248/161 |
| 2007/0045494 | A1 * | 3/2007 | Teng ............................. | 248/300 |

* cited by examiner

*Primary Examiner* — Anita M King

(57) ABSTRACT

A display support includes a sliding module and a base module detachably connected to each other. The sliding module includes a first integral-formed frame and a second integral-formed frame movably disposed therein. When using the display support, the sliding module is joined in a receiving portion of the base module.

15 Claims, 22 Drawing Sheets

DISPLAY SUPPORT

CROSS REFERENCE TO RELATED APPLICATIONS

This is a division of application Ser. No. 12/197,927, filed Aug. 25, 2008, which claims priority under 35 U.S.C. §119(a) on Patent Application No(s). 96138644 filed in Taiwan, Republic of China on Oct. 16, 2007 and Patent Application No(s). 96148895 filed in Taiwan, Republic of China on Dec. 20, 2007, the entire contents of which are hereby incorporated by reference.

BACKGROUND OF THE INVENTION

1. Field of the Invention

The invention relates in general to a display support and in particular to a display support having sliding mechanism.

2. Description of the Related Art

Referring to FIGS. 1A and 1B, a conventional display support 100 primarily includes a first metal frame 110, a second metal frame 120, a restricting member 130, and a protrusion 140. The first metal frame 110 is fixed to a pedestal (not shown), and the second metal frame 120 is movably disposed in the first metal frame 110 along Z axis. The restricting member 130 is mounted on the first metal frame 110 by screws, and the protrusion 140 is formed on a surface of the second metal frame 120.

As shown in FIG. 1B, when the second metal frame 120 slides with respect to the first metal frame 110 along Z direction to a limit position, the restricting member 130 abuts the protrusion 140 to prevent separation of the second metal frame 120 from the first metal frame 110. However, the first and second metal frames 110 and 120 are usually manufactured by mechanical stamping, having high production cost and requiring lots of screws for assembly.

BRIEF SUMMARY OF INVENTION

The invention provides a display support including a sliding module and a base module detachably connected to each other. The sliding module includes a first integral-formed frame and a second integral-formed frame movably disposed therein. When using the display support, the sliding module is inserted into the base module.

An embodiment of the first integral-formed frame comprises a first joining portion, and the second integral-formed frame comprises a flexible structure having a second joining portion joined with the first joining portion when the sliding module is in a retracted state. The base module comprises a receiving portion and a protrusion disposed in the receiving portion. When the sliding module in the retracted state is inserted into the receiving portion, the first integral-formed frame is joined to the base module, and the second joining portion is disengaged from the first joining portion by a slope of the protrusion pressing and deforming the flexible structure.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1A:
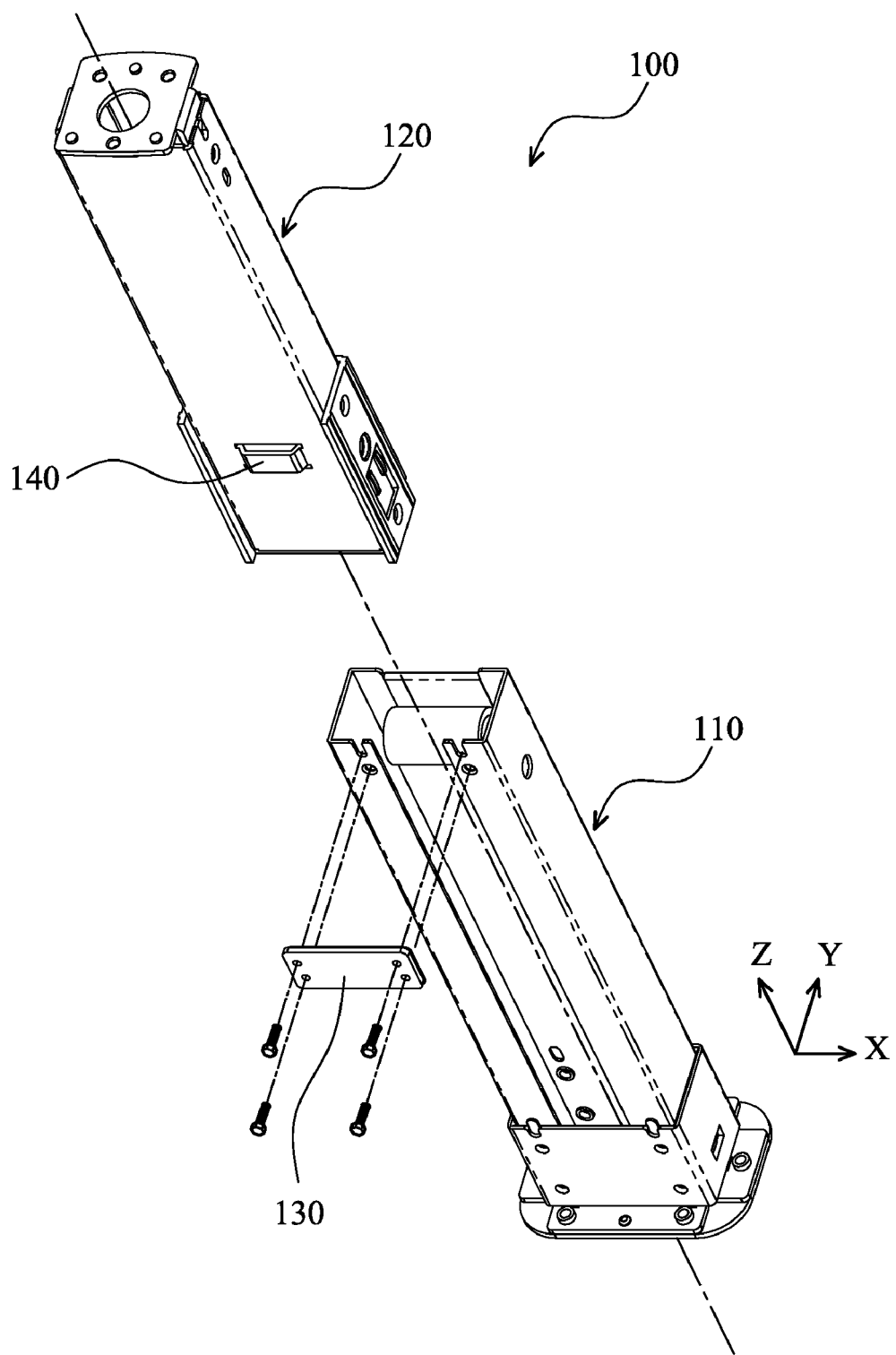
FIGS. 1A and 1B are perspective diagrams of a conventional display support.
Figure 1B:
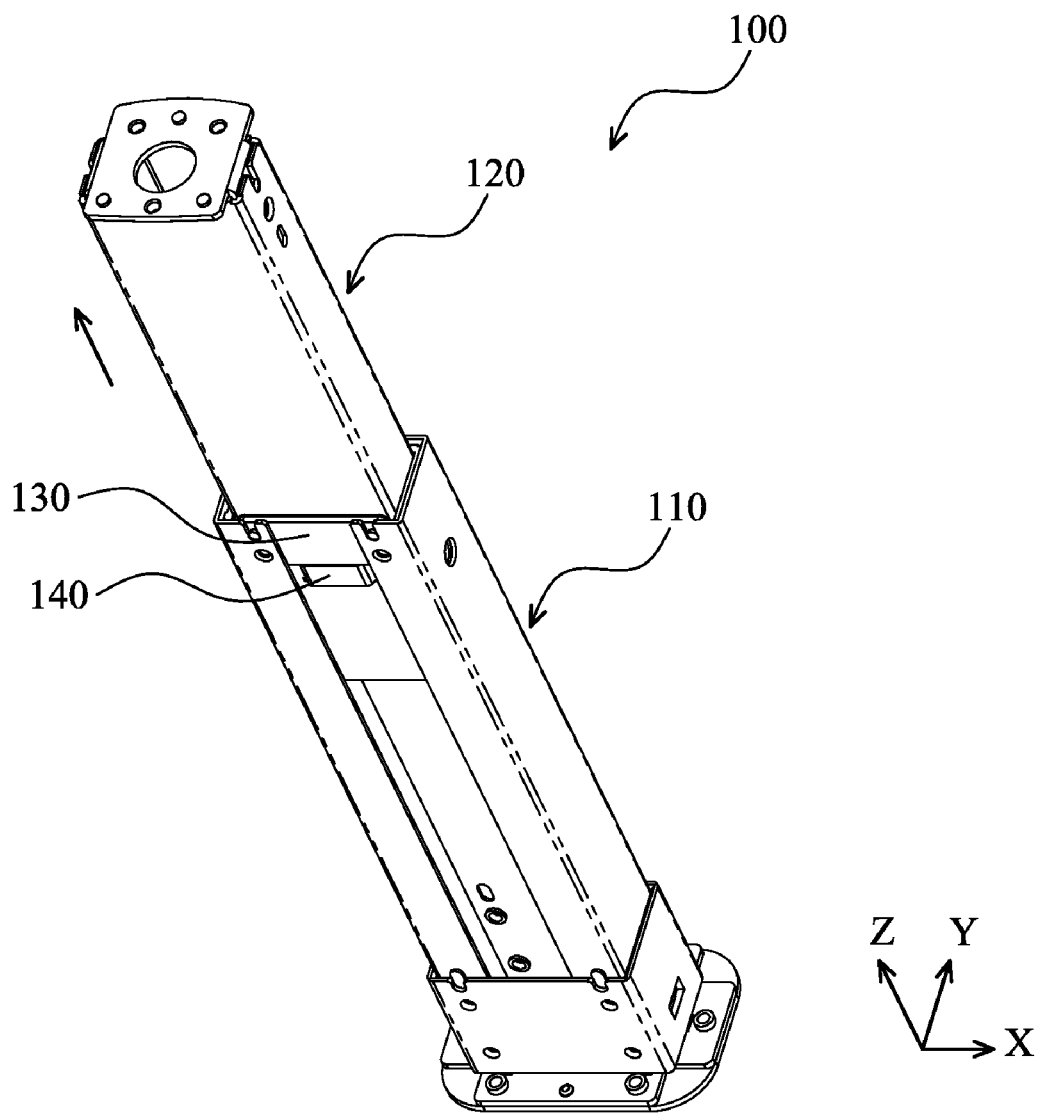
Figure 2:
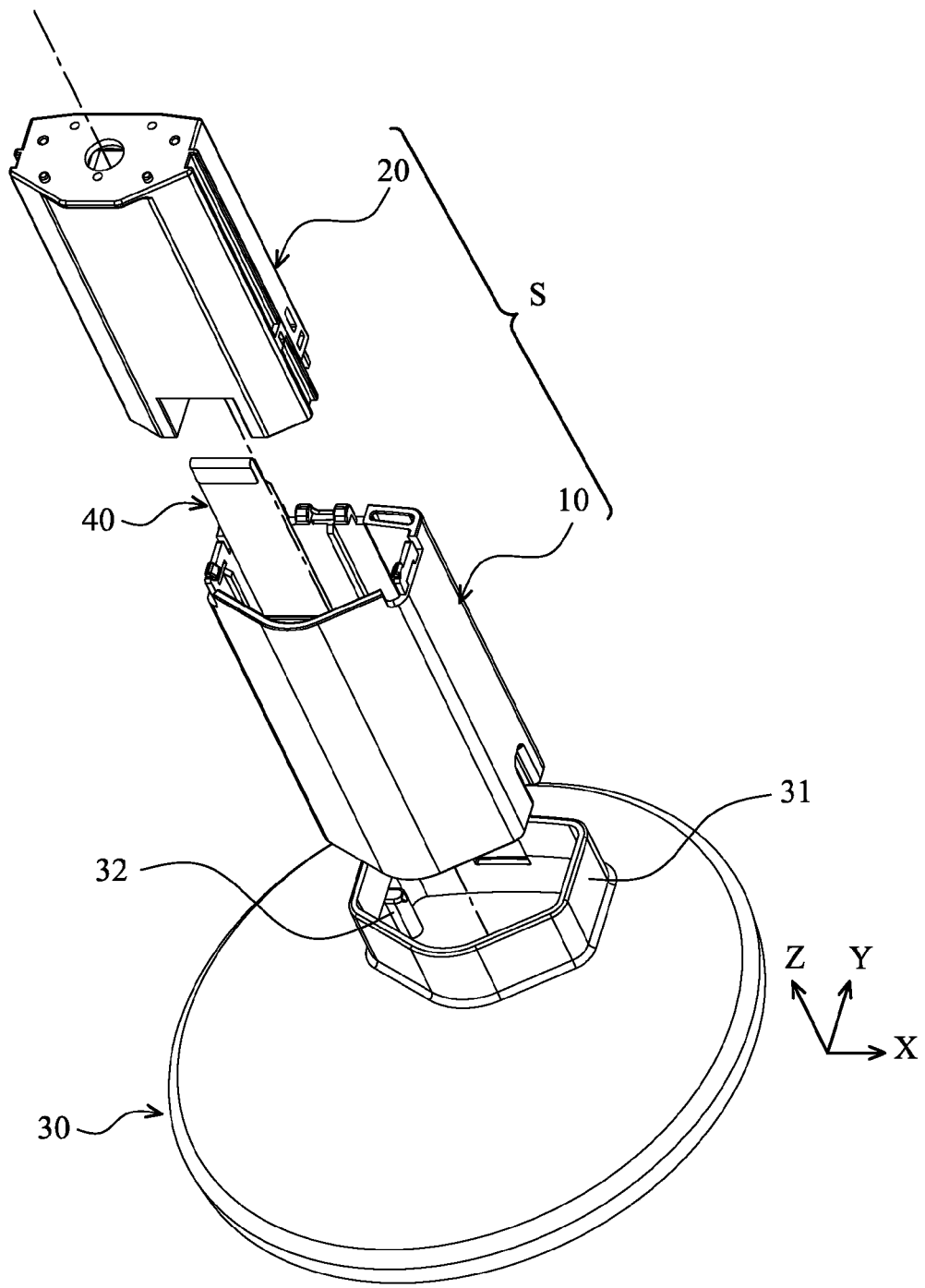
FIG. 2 is an exploded diagram of an embodiment of a display support.

Referring to FIG. 2, an embodiment of a display support primarily includes a sliding module S, a base module 30, and a constant spring 40. The sliding module S comprises a plastic first integral-formed frame 10 and a plastic second integral-formed frame 20 movably received therein. As shown in FIG. 2, the base module 30 comprises a receiving portion 31 with the sliding module S joined therein. The constant spring 40 connects the first and second integral-formed frames 10 and 20 of the sliding module S.

Figure 3A:
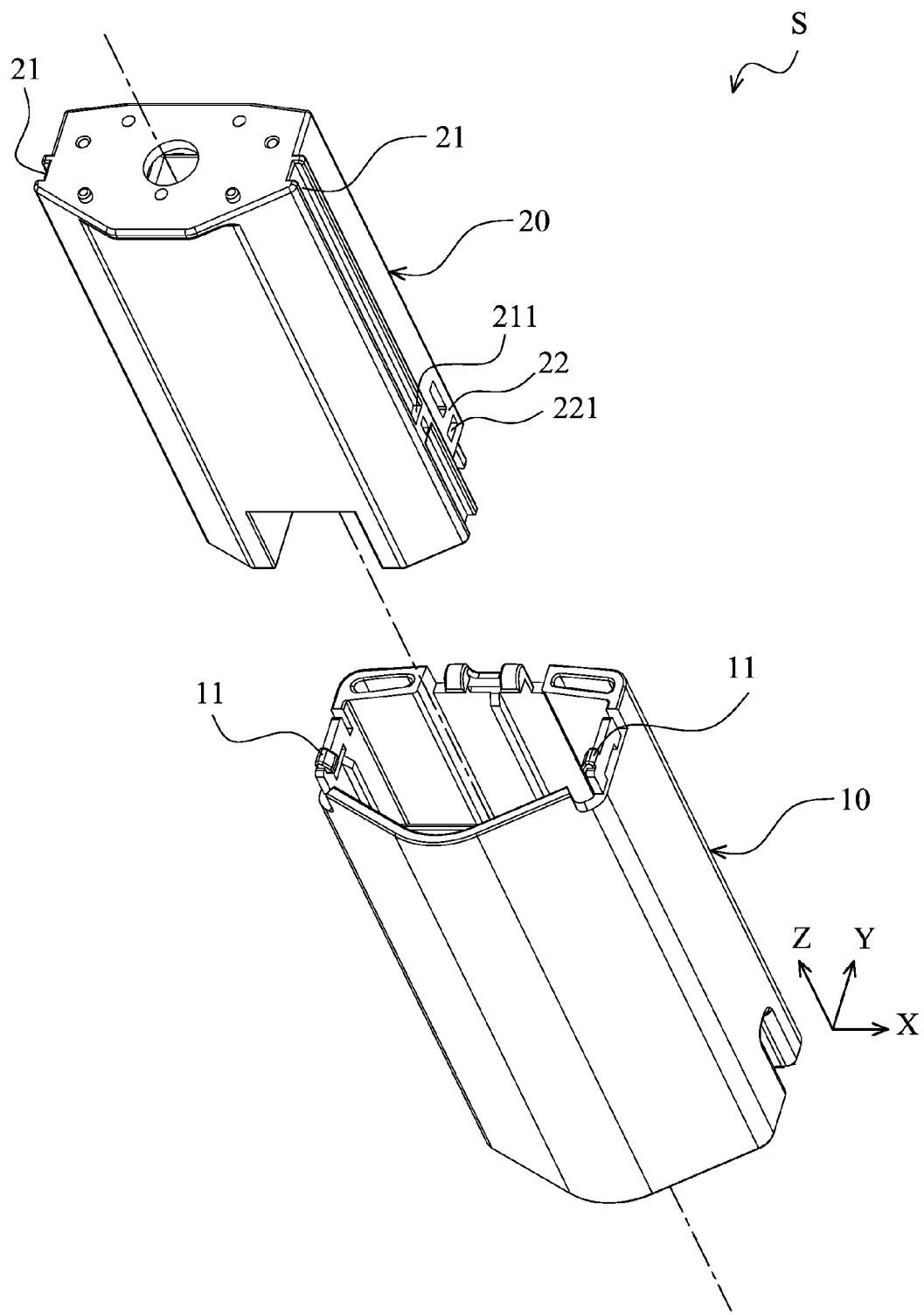
FIG. 3A is a perspective diagram of the first and second integral-formed frames in FIG. 2.
Figure 3B:
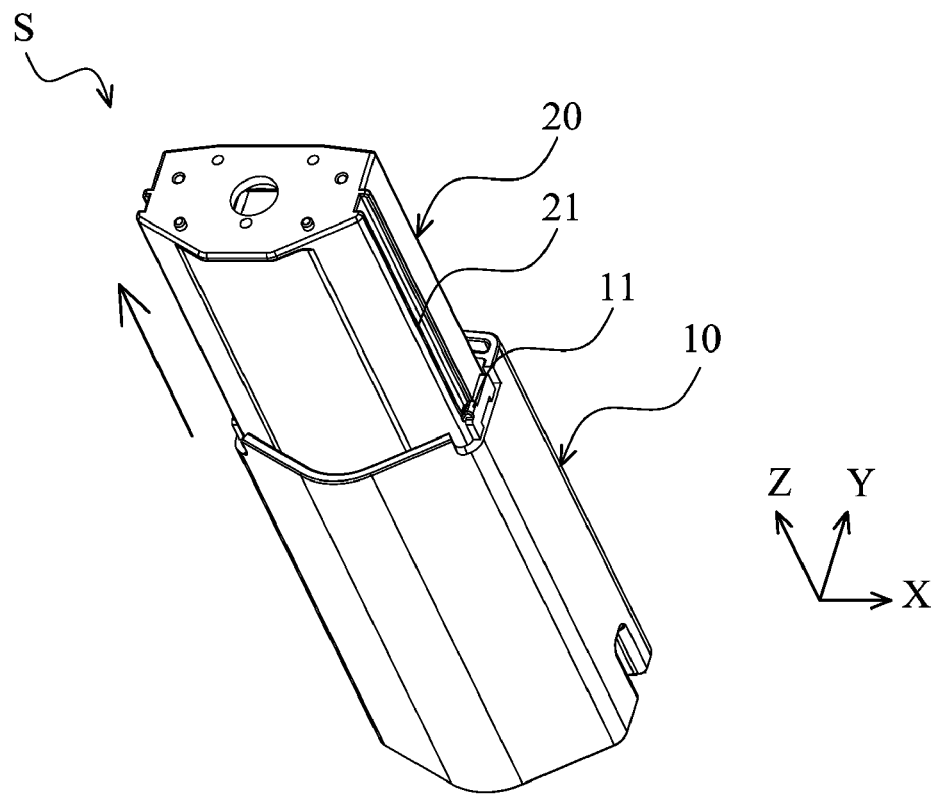
FIG. 3B is a perspective diagram of the second integral-formed frame sliding with respect to the first integral-formed frame.

Referring to FIGS. 3A and 3B, the first integral-formed frame 10 comprises at least a hook 11, and the second integral-formed frame 20 comprises at least a slot 21 and a stopper 211 disposed therein. During assembly, the second integral-formed frame 20 is inserted into the first integral-formed frame 10, and the hook 11 is movably received in the slot 21. When the second integral-formed frame 20 slides with respect to the first integral-formed frame 10 to a limit position, as shown FIG. 3B, the hook 11 slides along the slot 21 and abuts the stopper 211, thereby presenting separation of the second integral-formed frame 20 from the first integral-formed frame 10.

Figure 4A:
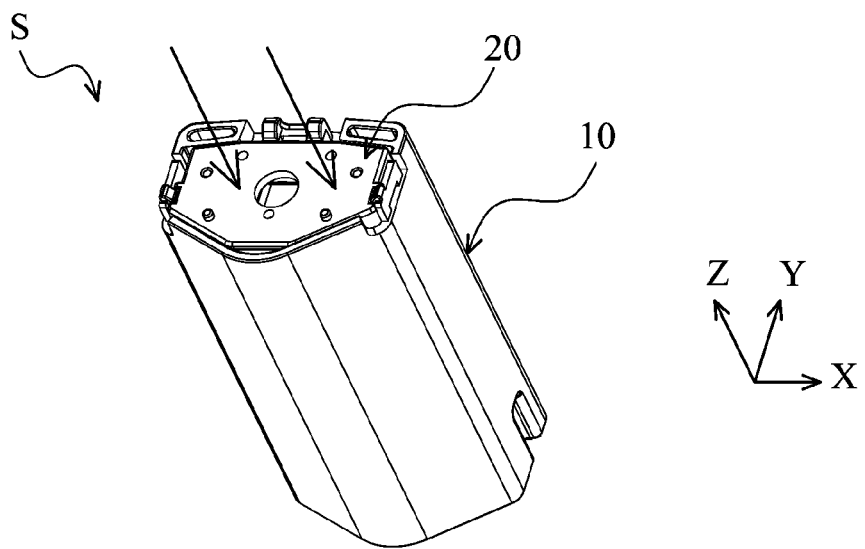
FIG. 4A is a perspective diagram of the sliding module in a retracted state.
Figure 4B:
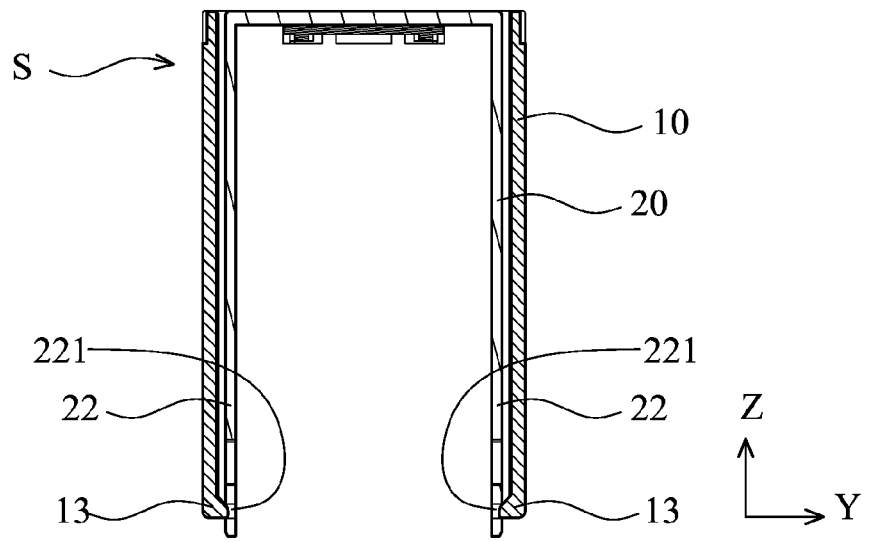
FIG. 4B is a sectional view of the sliding module in FIG. 4A.

Before using the support, as shown in FIGS. 4A and 4B, the second integral-formed frame 20 is retracted into the first integral-formed frame 10, and the sliding module S is in a retracted state for easy storage and package. In FIG. 4B, a nub 13 (first joining portion) projecting from an inner surface of the first integral-formed frame 10 is joined in a hole 221

Figure 5:
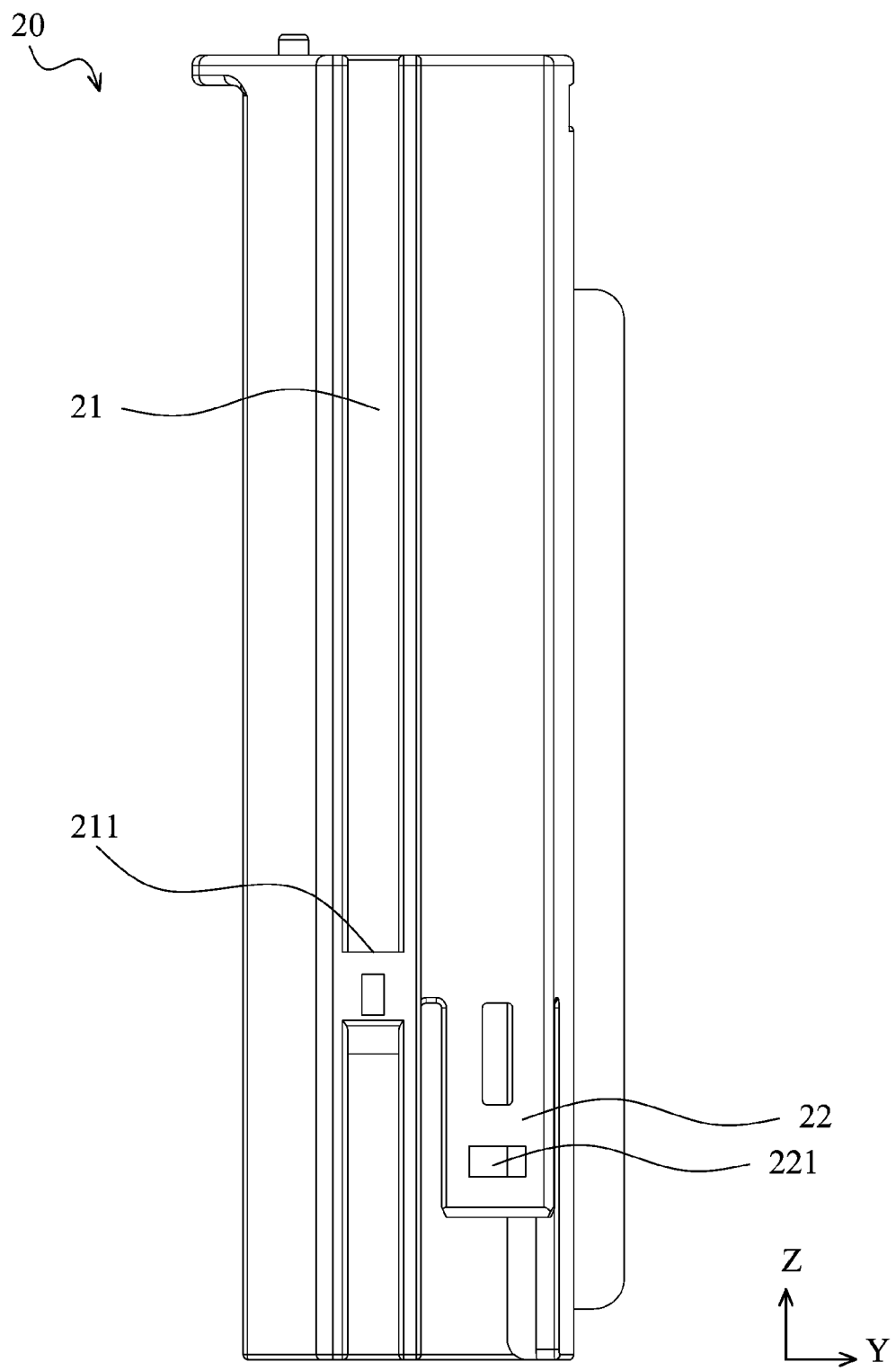
FIG. 5 is a side view of the second integral-formed frame.

(second joining portion) of the second integral-formed frame 20, thus preventing relative sliding between the first and second integral-formed frames 10 and 20. Referring to FIGS. 3A and 5, the hole 221 is formed on a flexible structure 22 of the second integral-formed frame 20, such as longitudinal cantilever extended along Z axis. When the second integral-formed frame 20 is retracted into the first integral-formed frame 10, the flexible structure 22 is pressed by the nub 13 and slightly deformed.

Figure 6:
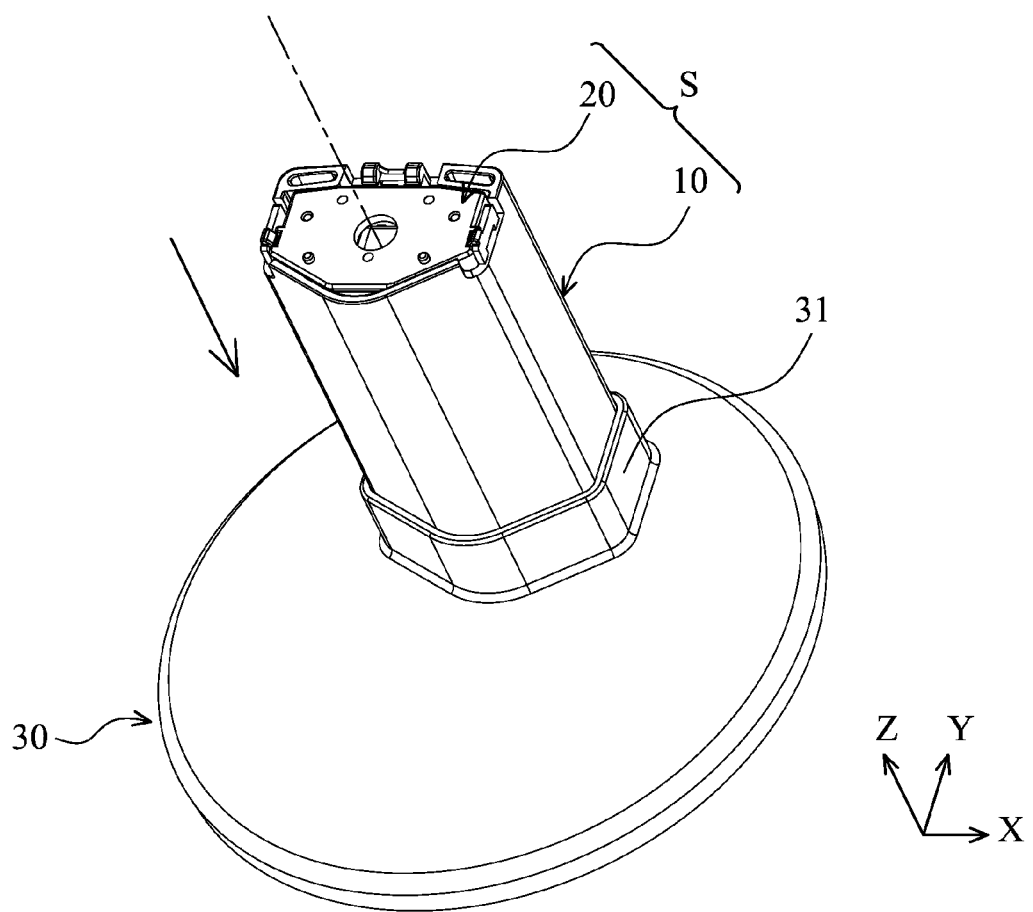
FIG. 6 is a perspective diagram of the sliding module joined in the base module.
Figure 7:
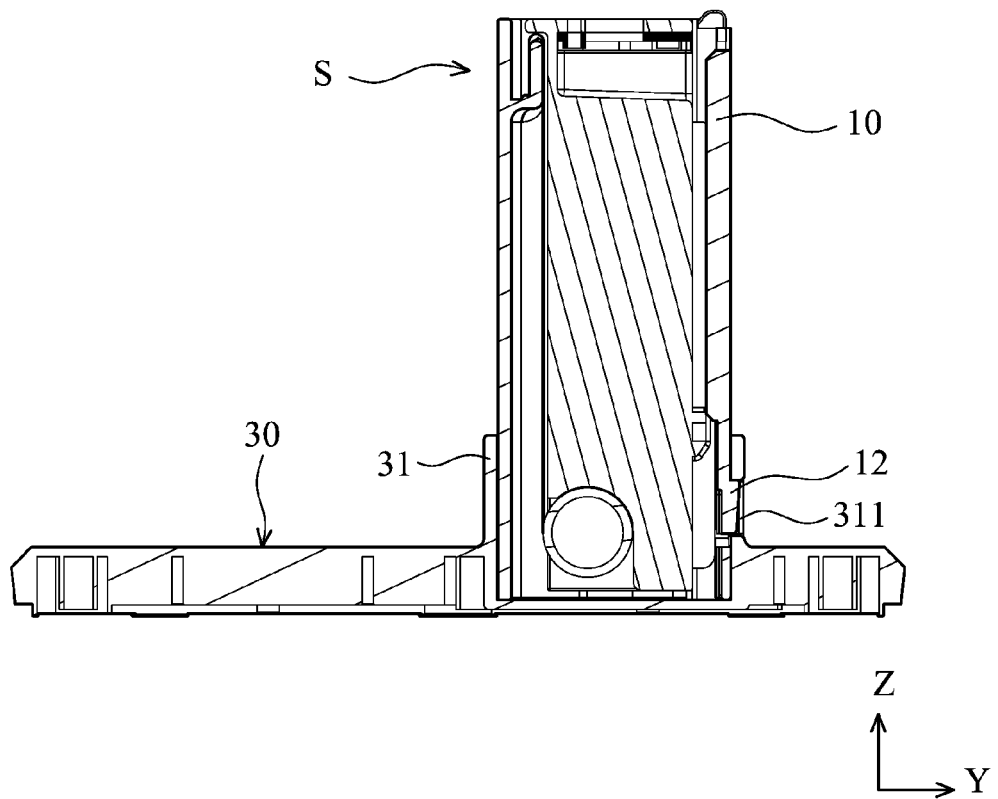
FIGS. 7 and 8A are sectional views of the sliding module and the base module.
Figure 8A:
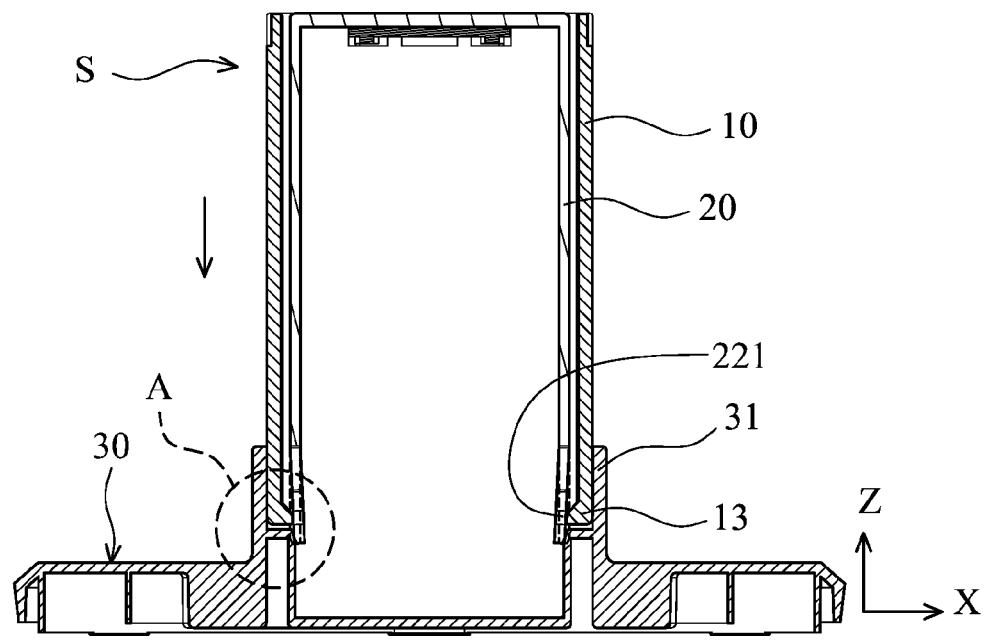
Figure 8B:
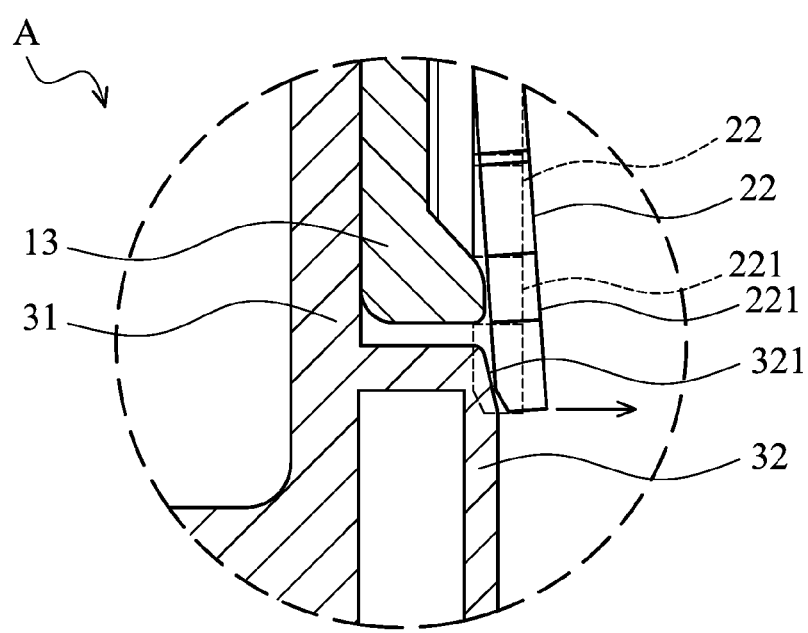
FIG. 8B is a large view of portion A in FIG. 8A.

Referring to FIGS. 6 and 7, when using the support, the sliding module S in the retracted state is inserted into the receiving portion 31 of the base module 30. Here, a latch 12 of the first integral-formed frame 10 is engaged with an opening 331 of the receiving portion 31, as shown in FIG. 7, thus fixing the sliding module S to the base module 30. Simultaneously, as shown in FIGS. 8A and 8B, a slope 321 of a protrusion 32 of the receiving portion 31 pushes against the flexible structure 22 of the second integral-formed frame 20, such that the nub 13 separates from the hole 221. Hence, the second integral-formed frame 20 is released from the retracted state and movable with respect to the first integral-formed frame 10 along Z axis for height adjustment of the support.

In this embodiment, the sliding module S can be shortened and held in the retracted state when the support is not in use, thus saving volume of product and cost of package. When using the support, the sliding module S is simply inserted into the receiving portion 31 of the base module 30, such that the second integral-formed frame 20 is released from the retracted state for extension of the support.

Figure 9:
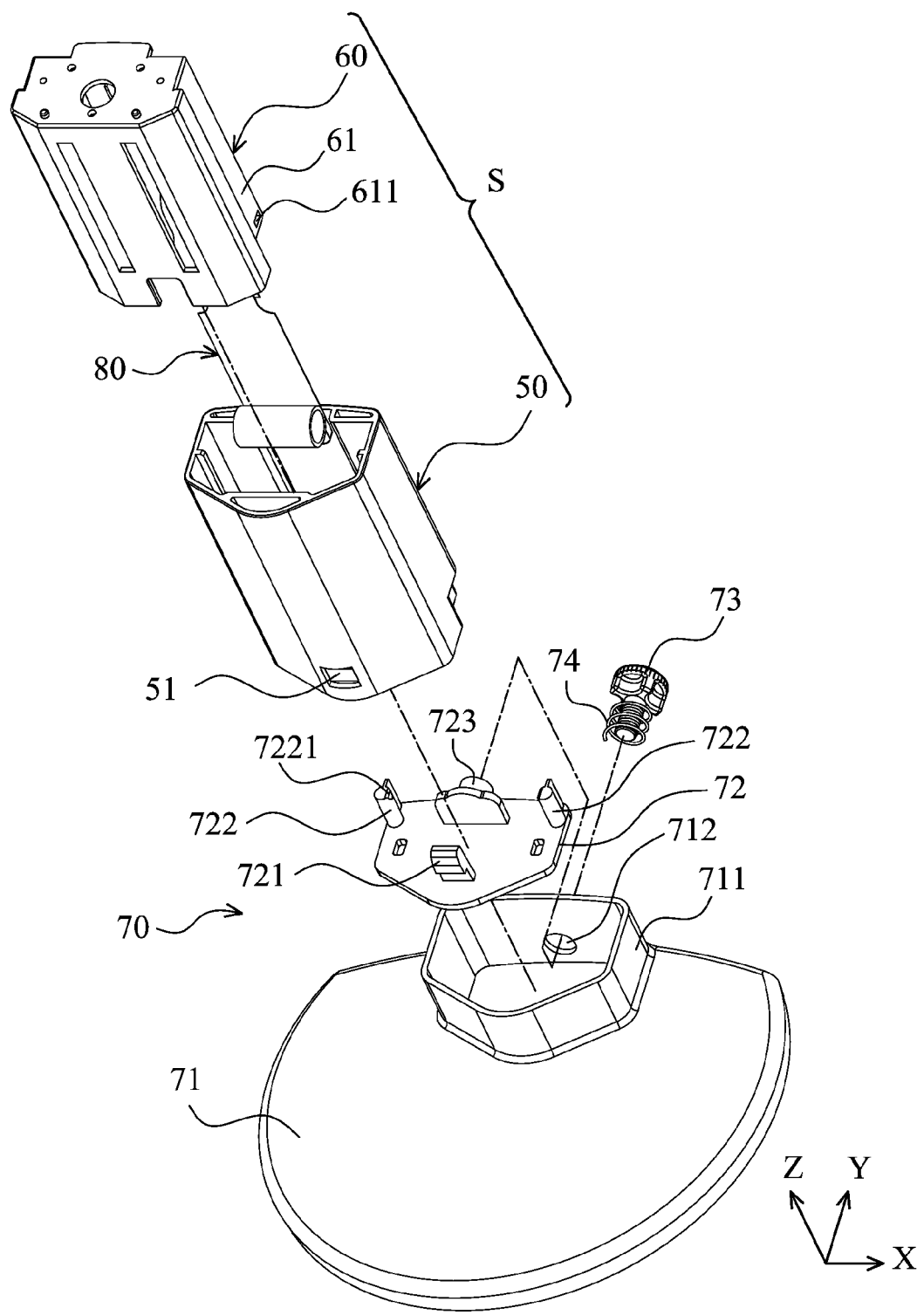
FIG. 9 is an exploded diagram of another embodiment of a display support.

Referring to FIG. 9, another embodiment of a display support primarily comprises a sliding module S, a base module 70, and a constant spring 80. The sliding module S comprises a first integral-formed frame 50 and a second integral-formed frame 60 movably received therein. The constant spring 80 connects the first and second integral-formed frames 50 and 60. As shown in FIG. 9, the base module 70 comprises a pedestal 71, a slider 72, a releasing member 73, and a spring 74. The pedestal 71 comprises a receiving portion 711, and the slider 72 comprises a latch 721, two protrusions 722 and a contact portion 723.

Figure 10:
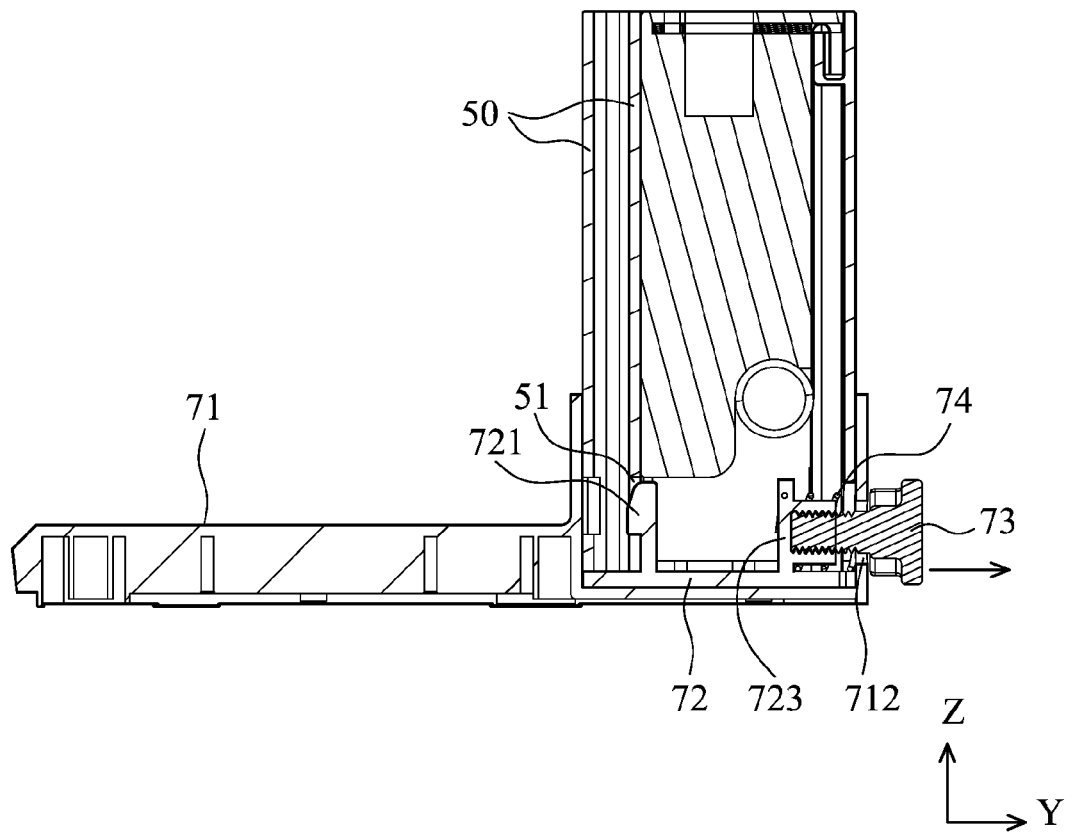
FIGS. 10 and 11A are sectional views of the sliding module and the base module in FIG. 9.

In this embodiment, the slider 72 is movably received in the receiving portion 711. The releasing member 73 is disposed through a through hole 712 of the receiving portion 711 and connected to the contact portion 723. The spring 74 is disposed around the releasing member 73 and abuts the contact portion 723 and an inner wall of the receiving portion 711. When the support is not in use, the sliding module is in a retracted state with the second integral-formed frame 60 retracted in the first integral-formed frame 50. When using the support, the sliding module S in the retracted state is inserted into the receiving portion 711 of the base module 71. Thus, the latch 721 of the slider 72 is engaged with an opening 51 of the first integral-formed frame 50, as shown in FIGS. 9 and 10, such that the sliding module S is fixed to the base module 71.

Figure 11A:
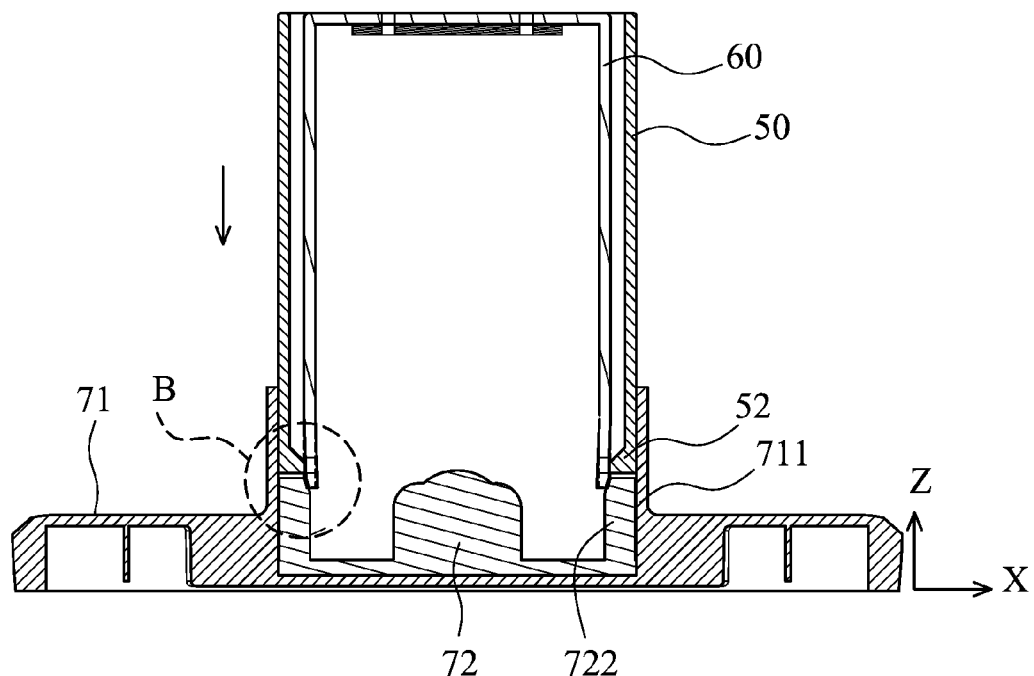
Figure 11B:
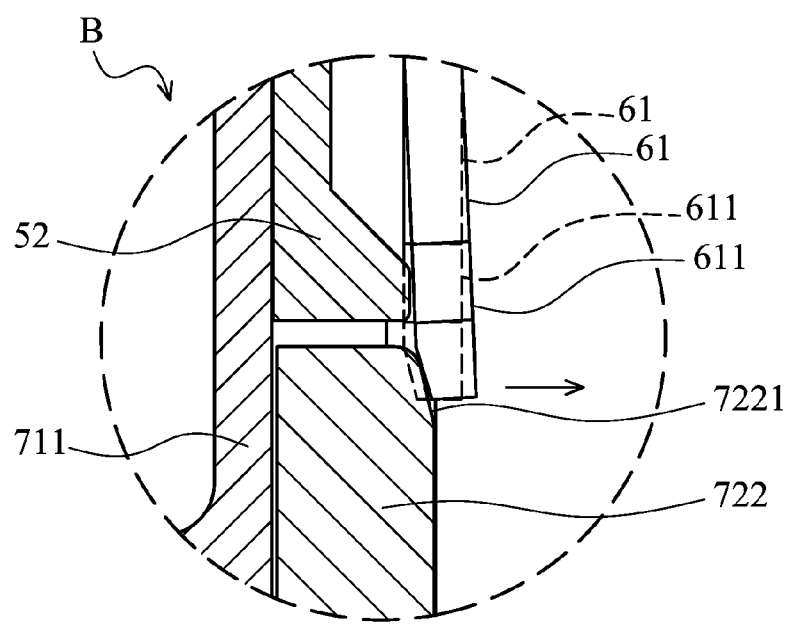
FIG. 11B is a large view of portion A in FIG. 11A.

During insertion of the sliding module S into the receiving portion 31, as shown in FIGS. 11A and 11B, a slope 7221 of the protrusion 722 pushes against a flexible structure 61 of the second integral-formed frame 60, such that a nub 52 (first joining portion) of the first integral-formed frame 50 disengages from corresponding hole 611 (second joining portion) of the second integral-formed frame 60. Hence, the second integral-formed frame 60 is released from the retracted state and movable with respect to the first integral-formed frame 50 along Z axis for extension of the support. Specifically, when the user pulls the releasing member 73, as the arrow indicates in FIG. 10, the latch 721 of the slider 72 is moved with the releasing member 73 and disengaged from the opening 51 of the first integral-formed frame 50, such that the sliding module S is detached from the base module 70.

Figure 12A:
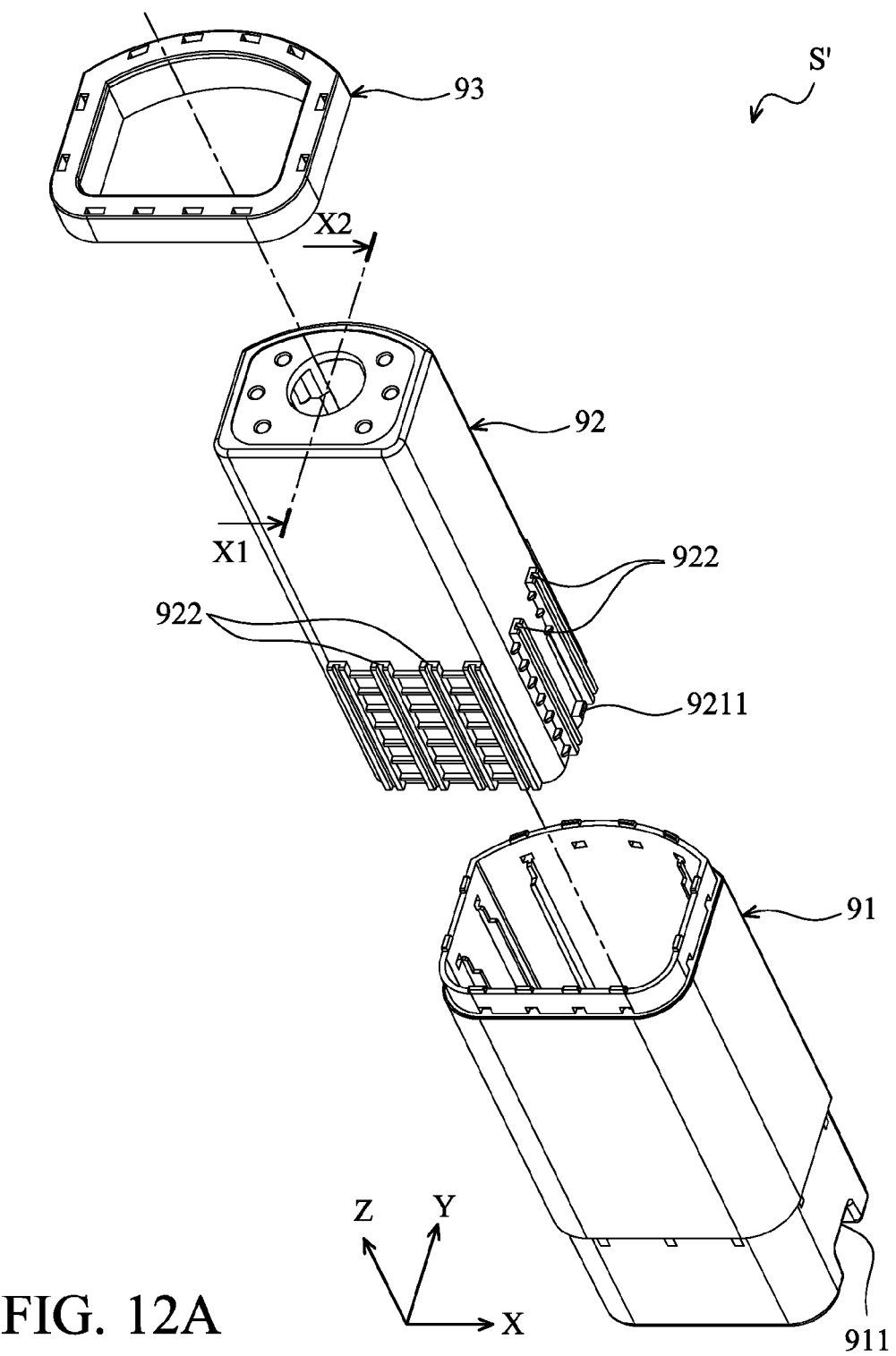
FIG. 12A is an exploded diagram of another embodiment of a sliding module.
Figure 12B:
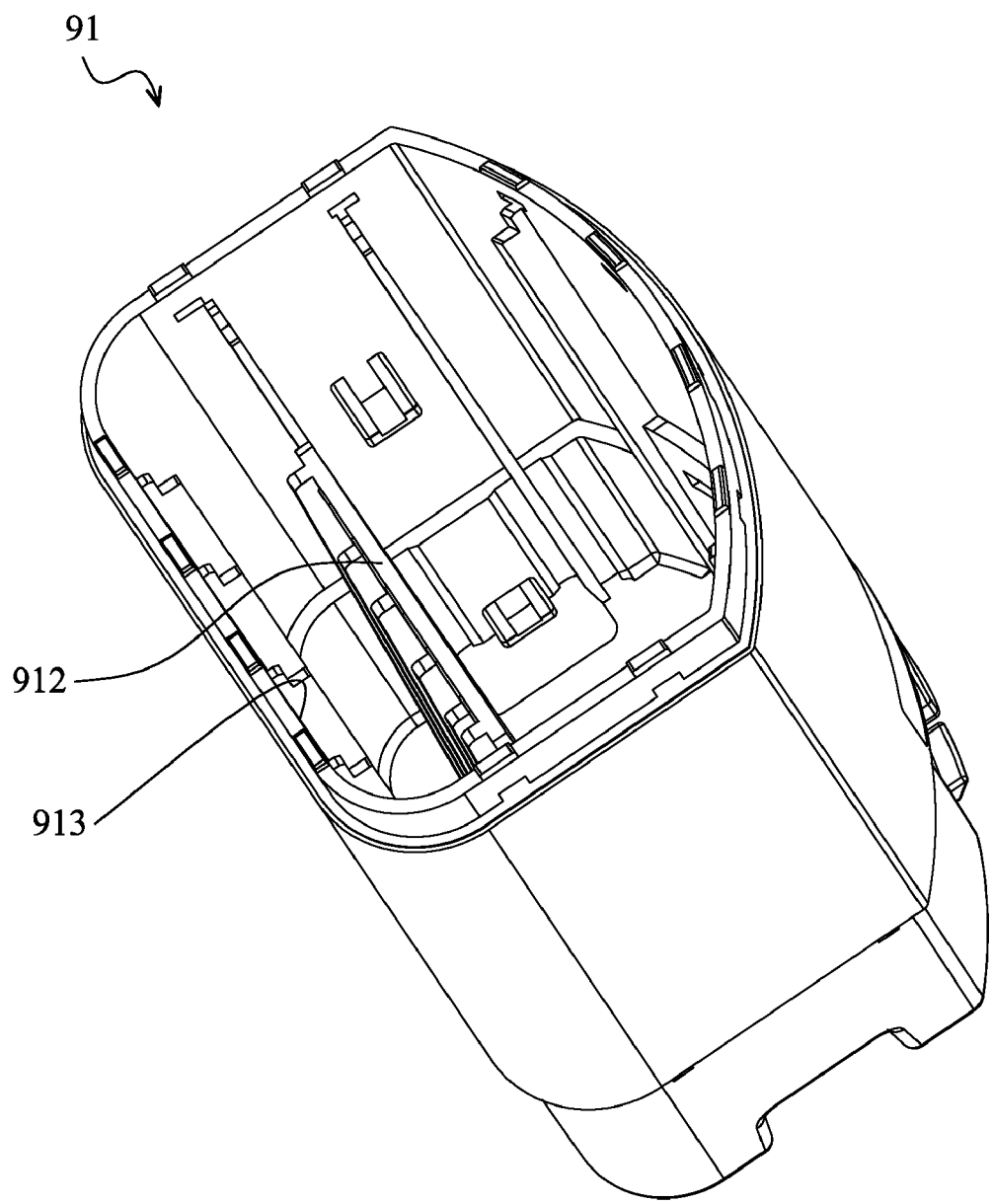
FIG. 12B is a perspective diagram of a first integral-formed frame.
Figure 12C:
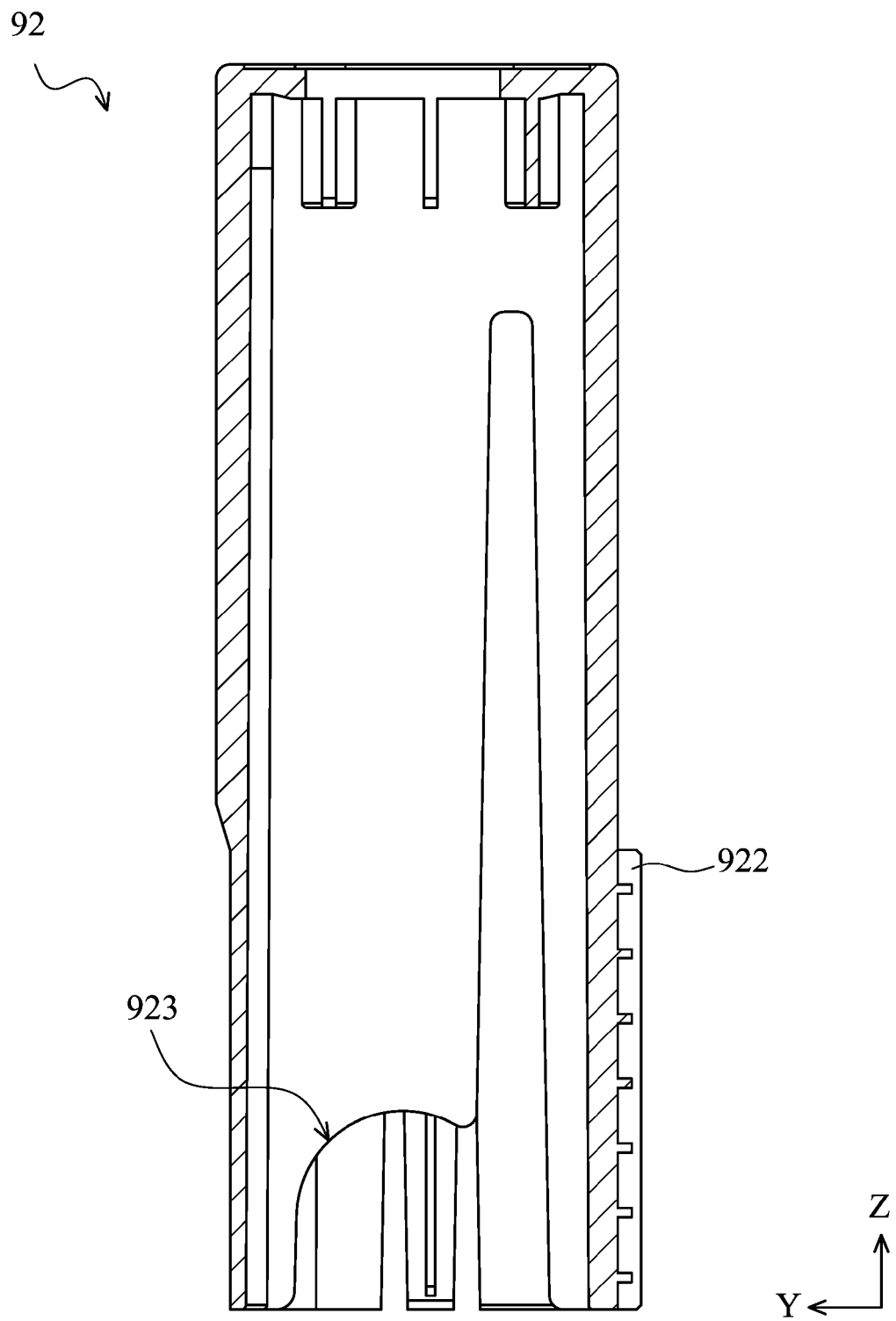
FIG. 12C is a sectional view of the second integral-formed frame along X1-X2 in FIG. 12A.

Referring to FIG. 12A, another embodiment of a sliding module S' comprises a first integral-formed frame 91, a second integral-formed frame 92, and a cover 93 fixed to an end of the first integral-formed frame 91. The second integral-formed frame 92 is movably received in the first integral-formed frame 91 and disposed through the cover 93. As shown in FIGS. 12B and 12C, the first integral-formed frame 91 has a longitudinal first connection portion 912, and correspondingly, the second integral-formed frame 92 has a curved second connection portion 923. In this embodiment, the first connection portion 912 forms a column extended along a longitudinal direction (Z direction) of the sliding module S'. A resilient member R, such as a constant spring shown in FIG. 14C, is hooked on the first connection portion 912 with an end thereof, and a round winding portion of the resilient member R naturally abuts the second connection portion 923 by spring force thereof, facilitating stable sliding and connection between the first and second integral-formed frames 91 and 92. Specifically, when the first integral-formed frame 91 slides relative to the second integral-formed frame 92 along the Z direction, the winding portion of the resilient member R moves relative to the first connection portion 912. Thus, the resilient member R is extendable and retractable along a longitudinal direction (Z direction) of the first connection portion 912.

Figure 13A:
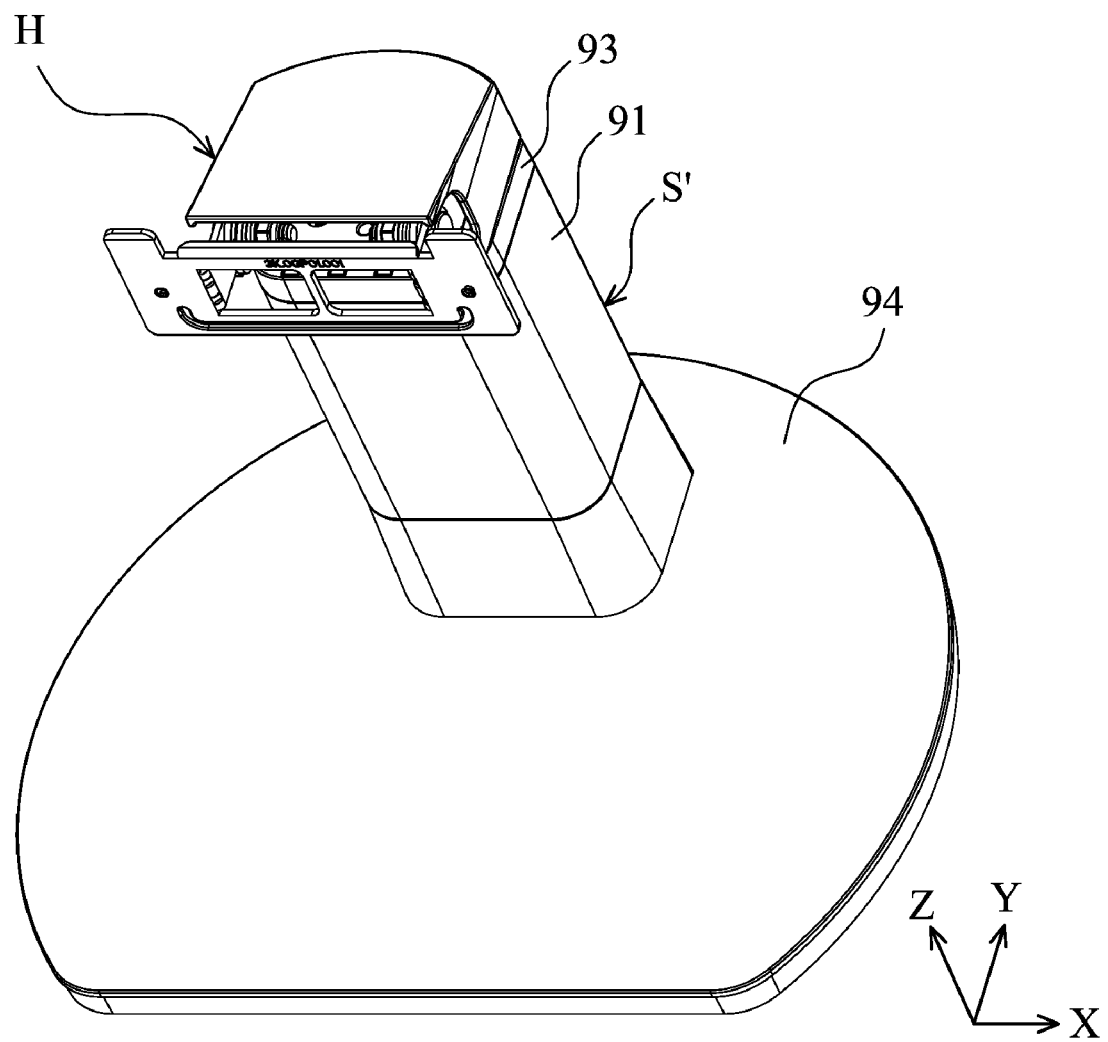
FIG. 13A is a perspective diagram of the sliding module inserted into the base module.

Referring to FIG. 13A, the sliding module S' is joined in a base module 94 and connected to a hinge mechanism H for supporting a display (not shown), wherein the display can be hung on the hinge mechanism H and capable of height adjustment. Before joining the sliding module S' to the base module 94, the sliding module S' is in a retracted state with the second integral-formed frame 92 hidden in the first integral-formed frame 91, as shown in FIG. 12A, wherein a recess 911 (first joining portion) of the first integral-formed frame 91 is engaged with a clasp 9211 (second joining portion) of the second integral-formed frame 92.

Figure 13B:
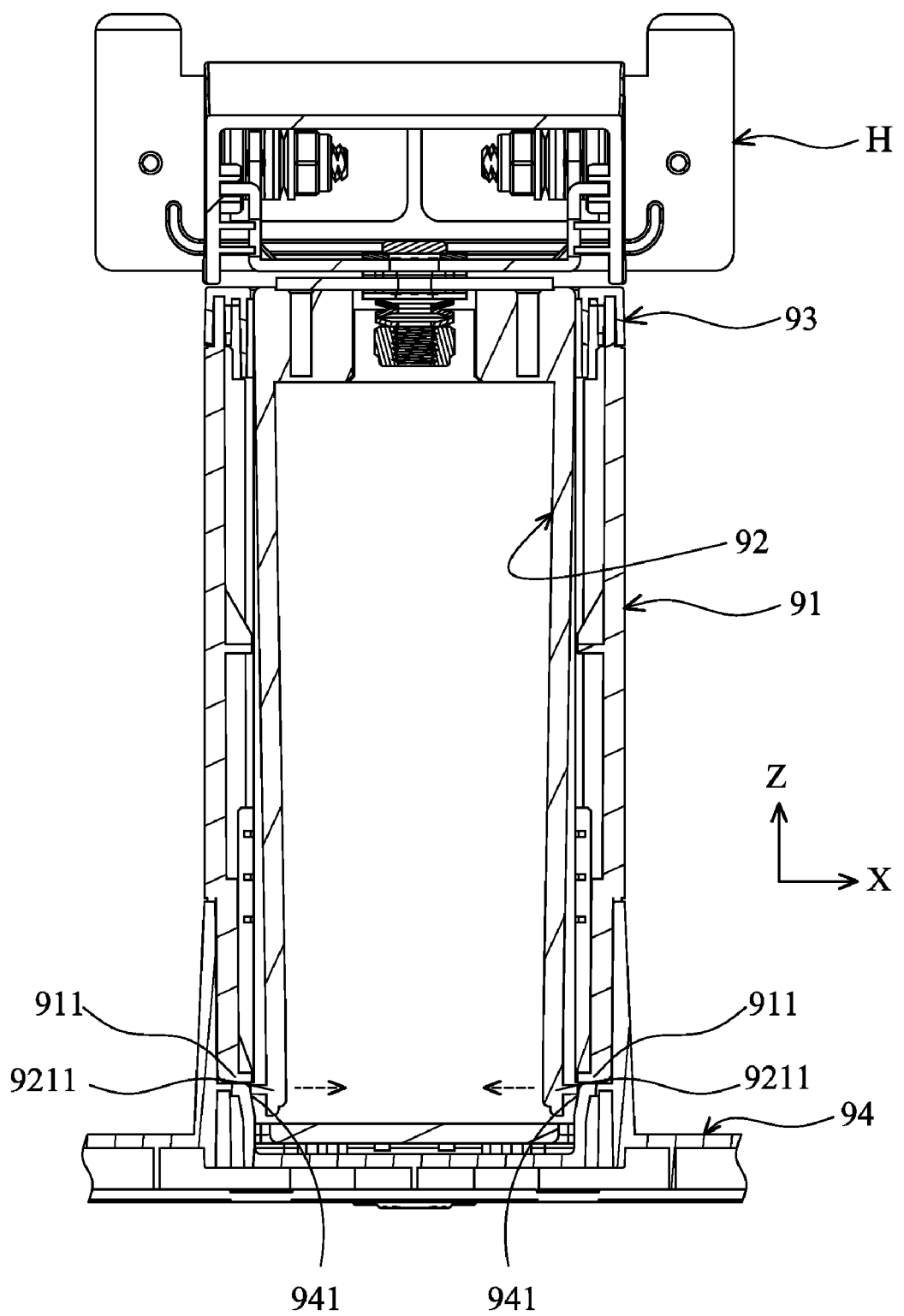
FIG. 13B is a sectional view of the sliding module sliding module and the base module in FIG. 13A.

Referring to FIG. 13B, when the sliding module S' in the retracted state is inserted into the base module 94, the first integral-formed frame 91 is fixed to the base module 94. Simultaneously, the clasp 9211 of the second integral-formed frame 92 is pressed and deformed by a slope 941 of the base module 94, as the arrow shown in FIG. 13B. Hence, the clasp 9211 is disengaged from the recess 911, such that the second integral-formed frame 92 is released from the retracted state and movable with respect to the first integral-formed frame 91 for height adjustment of the support.

Figure 14A:
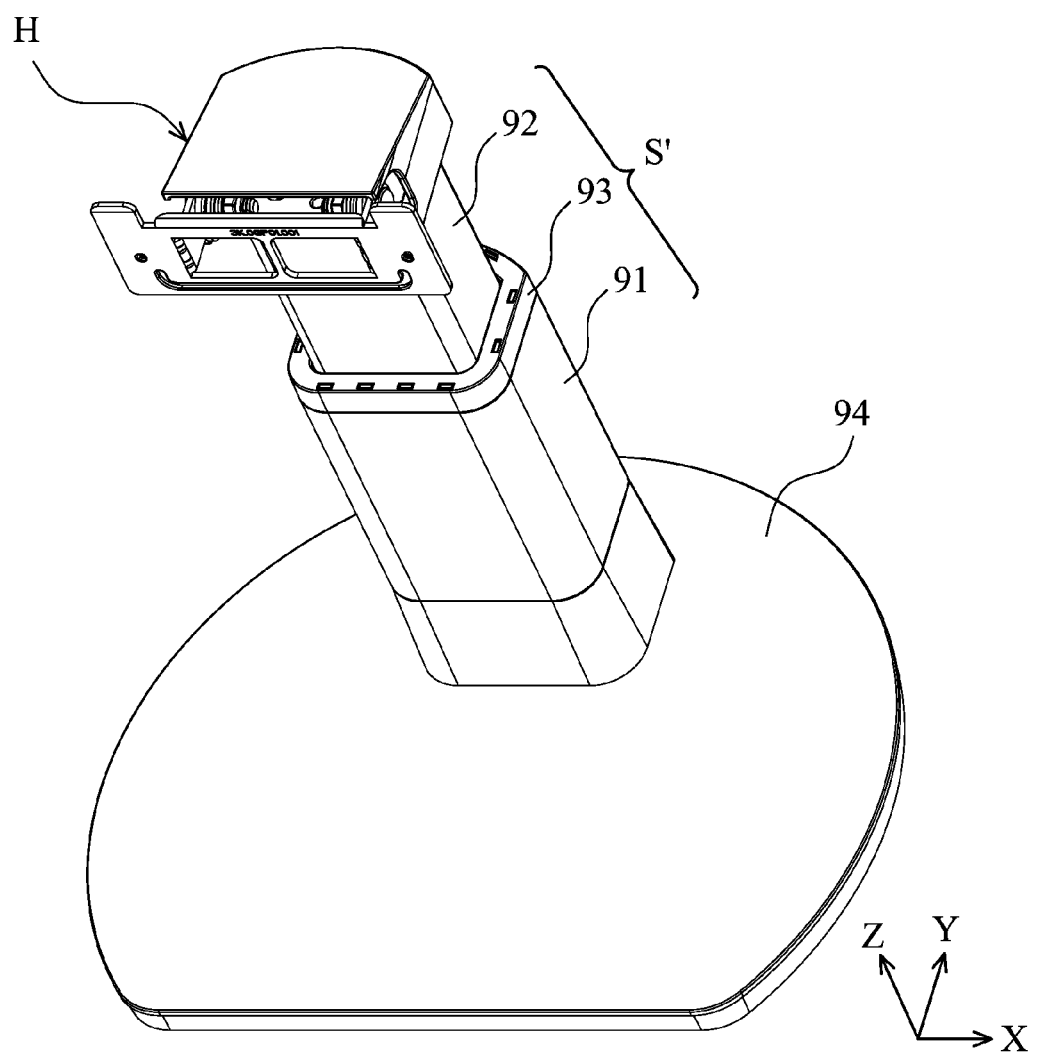
FIG. 14A is a perspective diagram of the display support when the second integral-formed frame slides with respect to the first integral-formed frame to a limit position.
Figure 14B:
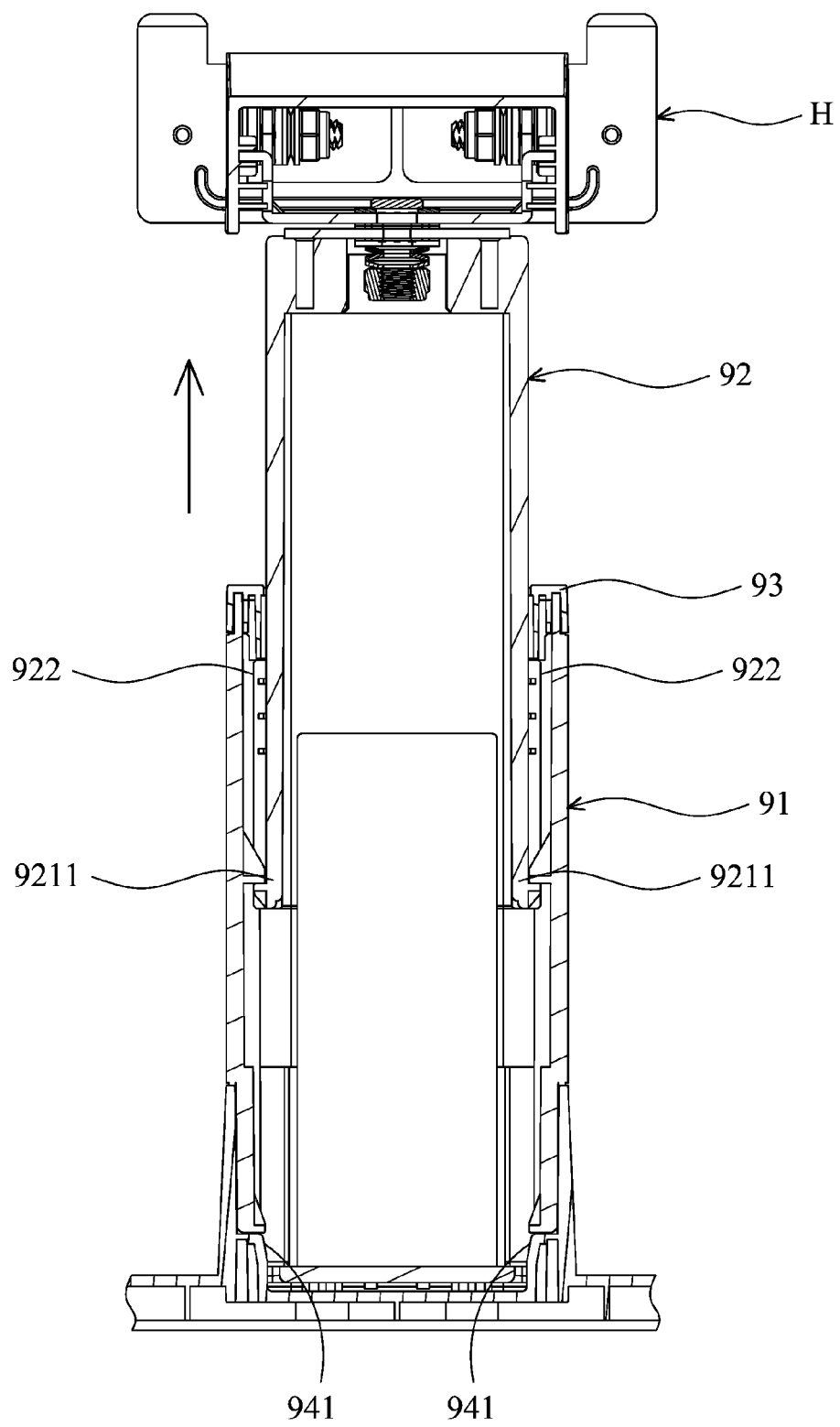
FIGS. 14B and 14C are sectional views of the display support in FIG. 14A.
Figure 14C:
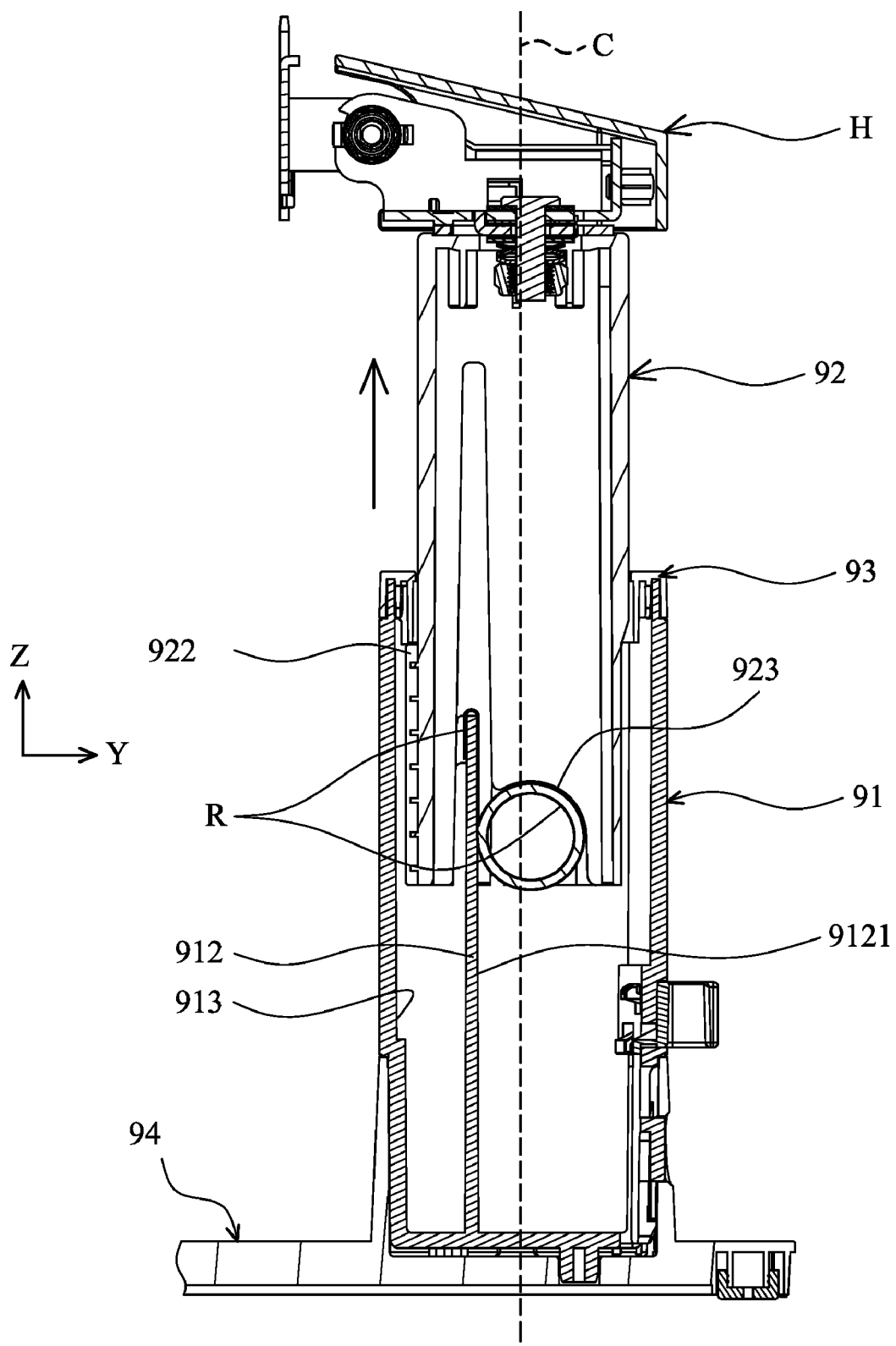

Referring to FIGS. 12 and 14A~14C, when the second integral-formed frame 92 slides to a limit position with respect to the first integral-formed frame 91, a rib 922 around the second integral-formed frame 92 abuts the cover 93, as shown in FIGS. 14B and 14C, thus preventing separation of the second integral-formed frame 92 from the first integral-formed frame 91.

Figure 14D:
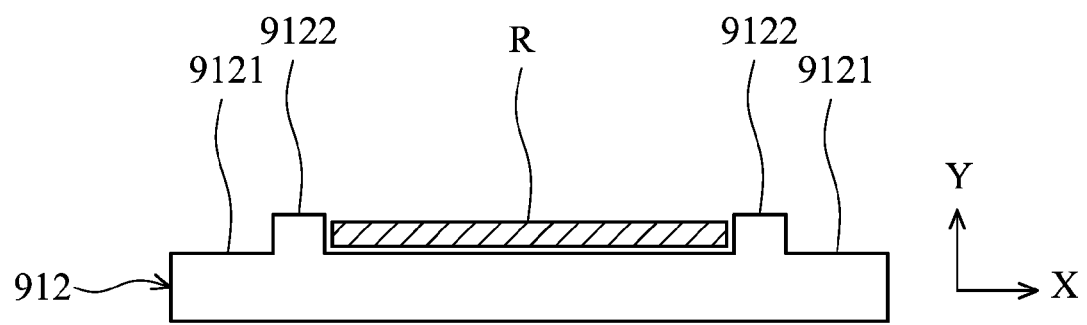
FIG. 14D is a sectional view of a resilient member positioned between two ridges of a first connection portion.

Referring to FIG. 14C, the first connection portion 912 forms a column between an inner wall 913 and a central axis C of the first integral-formed frame 91, wherein the column is spaced apart from the inner wall 913. As the resilient member R is hooked on the first connection portion 912 and naturally abuts the second connection portion 923 by spring force thereof, an upward force is exerted on the second integral-formed frame 92 for easy extension of the support. As shown in FIGS. 14C and 14D, the resilient member R is positioned between two ridges 9122 on a surface 9121 of the first connection portion 912, preventing deviation of the resilient member R along X axis and facilitating stability of the sliding mechanism.

In this embodiment, the first and second connection portions 912 and 923 are integrally formed with the first and second integral-formed frames 91 and 92 respectively, comprising a screw-less sliding mechanism. Furthermore, as the resilient member R connects the first and second connection portions 912 and 923 merely by spring force thereof, no screw or fastener is required for assembly, thus reducing production cost thereof.

The invention provides a display support comprising a sliding module having two integral-formed frames, capable of a screw-less structure and less number of parts than conventional support mechanism. In particular, when the support is not in use, the sliding module can be retracted for easy storage and package thereof.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A display support comprising:
   a sliding module comprising:
      a first integral-formed frame comprising a first joining portion and a first positioning portion, wherein the first positioning portion forms a column extended along a longitudinal direction thereof;
      a second integral-formed frame movably connected to the first integral-formed member, and comprising a flexible structure, wherein the flexible structure has a second positioning portion and a second joining portion joined with the first joining portion when the sliding module is in a retracted state; and
   a resilient member, comprising an end hooked on the column and a winding portion abutting the second positioning portion, wherein when the first integral-formed frame slides relative to the second integral-formed frame along the longitudinal direction of the column, the winding portion of the resilient member is extended or retracted along the longitudinal direction.

2. The display support as claimed in claim 1, wherein the first and second integral-formed frames are made of plastic.

3. The display support as claimed in claim 1, wherein the second integral-formed frame is movably received in the first integral-formed frame.

4. The display support as claimed in claim 1, wherein the first integral-formed frame further comprises a hook, and the second integral-formed frame further comprises a slot and a stopper, wherein when the second integral-formed frame is extended from the first integral-formed frame to a limit position, the hook slides along the slot and abuts the stopper to prevent separation of the second integral-formed frame from the first integral-formed frame.

5. The display support as claimed in claim 1, wherein the resilient member comprises a constant force spring connecting the first and second integral-formed frames.

6. The display support as claimed in claim 1, wherein the first joining portion comprises a nub, and the second joining portion comprises a hole.

7. The display support as claimed in claim 1, wherein the display support further comprises a base module comprising a receiving portion and a protrusion disposed in the receiving portion, the protrusion having a slope, wherein when the sliding module in the retracted state is inserted into the receiving portion, the first integral-formed frame is joined to the base module, and the second joining portion is disengaged from the first joining portion by the slope deforming the flexible structure.

8. The display support as claimed in claim 7, wherein the first integral-formed frame further comprises a latch, and the base module further comprises an opening with the latch joined therein when the sliding module is inserted into the receiving portion, such that the first integral-formed frame is fixed to the base module.

9. The display support as claimed in claim 7, wherein the first integral-formed frame further comprises an opening, and the base module further comprises a latch, a slider movably disposed in the receiving portion, a spring abutting the slider and an inner wall of the receiving portion, and a releasing member connected to the slider, wherein the latch and the protrusion are disposed on the slider, the latch is engaged in the opening when the sliding module is inserted into the receiving portion, and the latch is disengaged from the opening when the slider is moved by an external force exerting on the releasing member, wherein the receiving portion has a through hole and the releasing member extends through the through hole to connect the slider.

10. A display support comprising:
    a sliding module comprising:
       a first integral-formed frame, comprising a first positioning portion, wherein the first positioning portion forms a column extended along a longitudinal direction thereof, wherein the column is disposed between an inner wall and a central axis of the first integral-formed frame, and the column is spaced apart from the inner wall;
       a second integral-formed frame movably received in the first integral-formed member; and
    a resilient member, comprising an end hooked on the column and a winding portion abutting a second positioning portion, wherein when the first integral-formed frame slides relative to the second integral-formed frame along a longitudinal direction of the column, the winding portion of the resilient member is extended or retracted along the longitudinal direction.

11. The display support as claimed in claim 10, wherein the first integral-formed frame further comprises a first joining portion, and the second integral-formed frame comprises a flexible structure forming a second joining portion joined with the first joining portion when the sliding module is in a retracted state.

12. The display support as claimed in claim 11, wherein the display support further comprises a base module comprising a slope, wherein when the sliding module in the retracted state is inserted into the base module, the first integral-formed frame is joined to the base module, and the slope presses the second joining portion to disengage from the first joining portion.

13. The display support as claimed in claim 11, wherein the first connection portion has a surface and two ridges projecting therefrom, and the resilient member is positioned between the ridges.

14. The display support as claimed in claim 11, wherein the first joining portion comprises a recess, and the second joining portion comprises a clasp.

15. The display support as claimed in claim 10, wherein the sliding module further comprises a cover connected to an end of the first integral-formed frame, and the second integral-formed frame further comprises a rib abutting the cover when the second integral-formed frame slides to a limit position with respect to the first integral-formed frame, thereby preventing separation of the second integral-formed frame from the first integral-formed frame.

\* \* \* \* \*